June 19, 1923.  1,459,035

C. RAISIG

FLEXIBLE COUPLING

Original Filed June 8, 1921   2 Sheets-Sheet 1

WITNESS
P. F. Dilworth

INVENTOR
Charles Raisig,
by
Edward A. Lawrence.
his attorney.

June 19, 1923.
C. RAISIG
FLEXIBLE COUPLING
Original Filed June 8, 1921   2 Sheets-Sheet 2
1,459,035
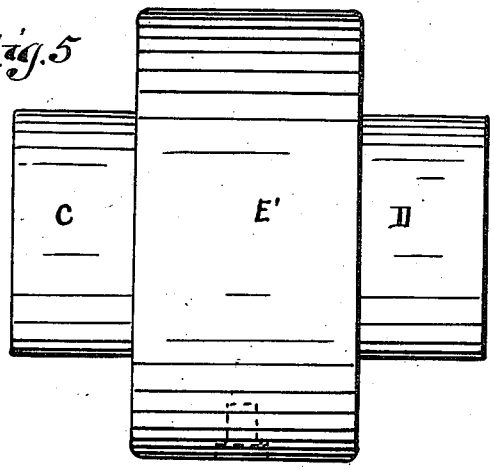
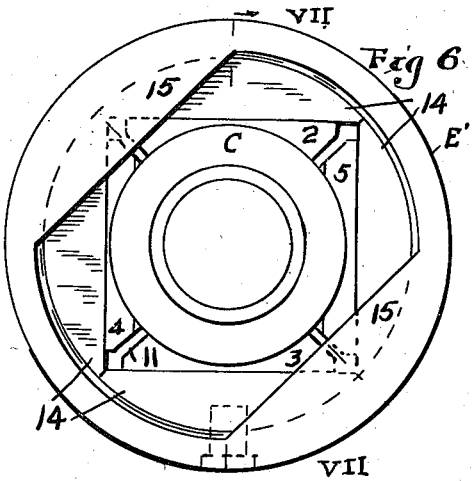
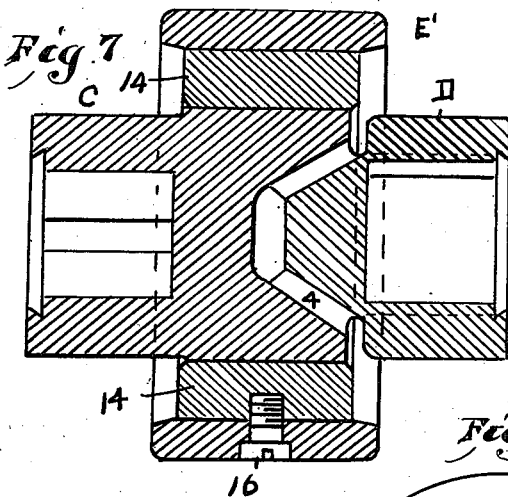
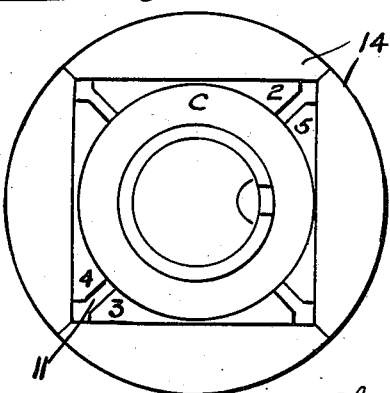
WITNESS
P F Dilworth
INVENTOR
Charles Raisig,
by Edward A. Lawrence,
his attorney.

Patented June 19, 1923.

1,459,035

UNITED STATES PATENT OFFICE.

CHARLES RAISIG, OF PITTSBURGH, PENNSYLVANIA.

FLEXIBLE COUPLING.

Application filed June 8, 1921, Serial No. 475,865. Renewed January 19, 1923.

*To all whom it may concern:*

Be it known that I, CHARLES RAISIG, a citizen of the United States, and residing in the city of Pittsburgh, in the county of Allegheny and State of Pennsylvania, have invented or discovered the new, useful, and Improved Flexible Couplings, of which the following is a specification.

My invention consists in a new and improved flexible coupling for shafting and the like.

The object which I have in view is the provision of a coupling of non-elastic material, which will permit of both parallel and angular misalinement of the shafts, and of their axial movement relative to each other, without involving a redistribution of the loads on the various bearings of the coupled shafts, whereby excessive stresses on the shafts and excessive bearing pressures on the shaft bearings are obviated; and which is quiet in its operation.

I accomplish this object by the provision of a coupling characterized by interlocking bearing planes so designed that both parallel and angular misalinements, and axial movements of the shafts in the relation to each other are permitted.

There are numerous embodiments of the principles of my invention which might be suggested to those skilled in the art by reading the following description, but for the sake of clearly setting forth said principles I have shown and described a convenient embodiment of my invention wherein the ends of the two shafts, or other elements to be coupled, are each provided with a pair of opposed and parallel bearing surfaces which are assembled in a suitable housing provided with bearing surfaces adapted to mate with those of the shafts, the bearing surfaces of one shaft being disposed at right angles to those of the other shaft, the bearing surfaces of the two shafts interlocking within the housing with sufficient interposed play or clearances to provide for the desired flexibility.

Many other novel features of construction and arrangement of parts will appear from the following description.

Figure 1:
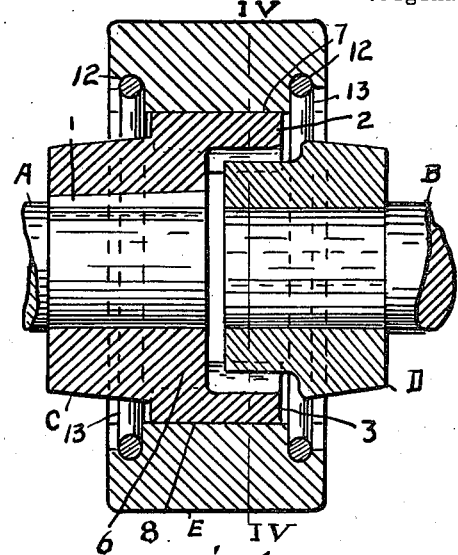
Figure 2:
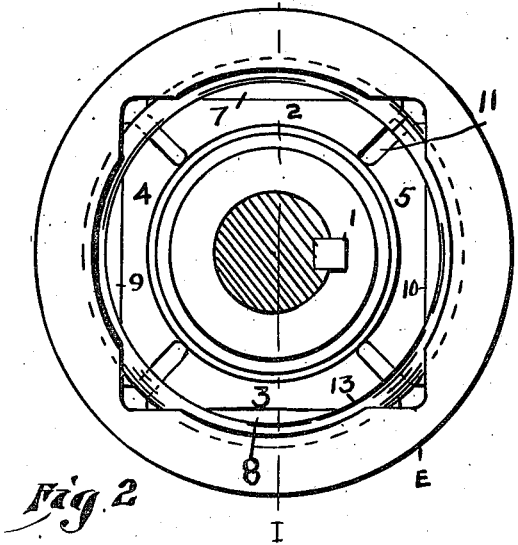
Figure 3:
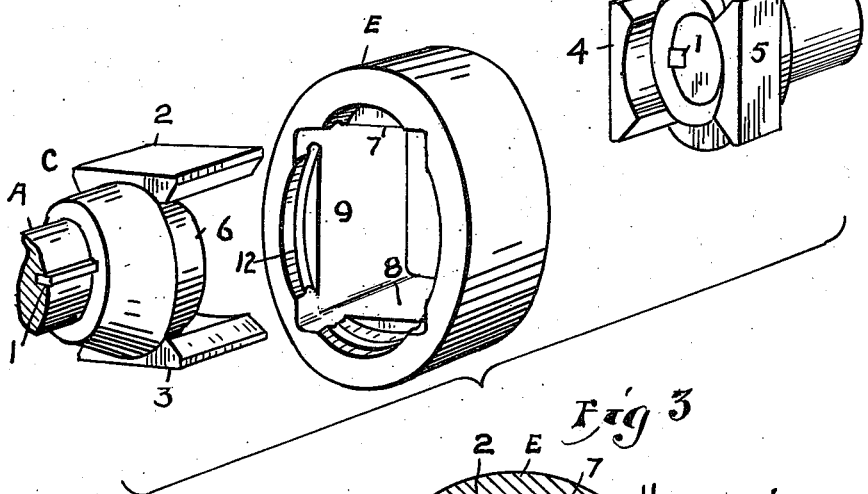
Figure 4:
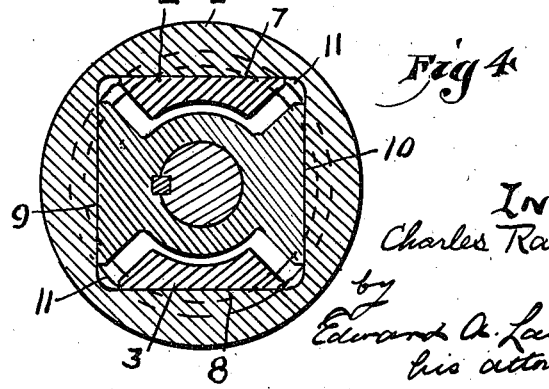

In the accompanying drawings, which are, however, merely intended to illustrate a practical embodiment of the principles of my invention without limiting the scope of the latter to the construction shown, Fig. 1 is a sectional view of a shaft coupling embodying the principles of my invention, said section being taken along the line I—I in Fig. 2; Fig. 2 is an end view of the coupling; Fig. 3 is a perspective view showing the coupling elements disassembled but alined; Fig. 4 is a cross section, on reduced scale, taken along the line IV—IV in Fig. 1; Fig. 5 is an elevation of a modified form of my improved coupling wherein the housing is provided with removable bearing blocks; Fig. 6 is an end view of the same; Fig. 7 is a sectional view taken along the line VII—VII in Fig. 6; and Fig. 8 shows the assemblage of the coupler members with the housing omitted.

The following is a detailed description of the drawings, reference being first had to Figs. 1 to 4, inclusive.

A and B are the two shafts or other members which are to be coupled together, C and D are a pair of heads provided with hubs which are mounted, respectively, on the ends of the shafts A and B, and which may be secured in place by means of the keys 1, or by any other suitable means. Each of said heads is shown provided with a pair of flat parallel, opposed bearing surfaces. Thus the head C is provided with the bearing surfaces 2 and 3, while the head D has the bearing surfaces 4 and 5, said surfaces being arranged to interlock when the shafts approach each other. 6 represents filler rings integral with the hubs and bearing portions of the heads which may be provided to strengthen the same.

E is the housing member shown in the form of a sleeve have a squared bore providing four symmetrically disposed flat bearing surfaces 7, 8, 9 and 10. The housing is preferably of bronze or cast iron.

In assembling the coupling the heads C and D are inserted into the opposite ends of the housing E, their bearing surfaces being turned at right angles to each other, so as to interlock with each other and also mate with the bearing surfaces of the housing.

In interlocking, the sides of the bearing surfaces of the heads do not abut together but play or movement is provided for by the spaces 11 which appear in Fig. 4 as radial of the housing, thus permitting the shifting of the heads in parallel and angular misalinement. The heads are also free to move toward or away from each other, thus providing for axial movement.

To prevent the housing E from shifting out of place, and thus impair the contact of the various bearing planes, I may provide any convenient means for limiting its movement relative to the shafts. Thus I have shown the ends of the housing provided with internal grooves or seats 12 to receive split, spring rings 13 which will contact with the ends of the bearing surfaces of the heads, thus limiting the movement of the head in relation to the housing, sufficient movement being however provided for to permit any desired separation of the heads in the housing.

The filler rings 6 are reduced in length to prevent undue interference with the approach of the shafts toward each other.

The functioning of the coupling will be understood by separately analyzing the motion when parallel misalinement or angular misalinement occurs.

The basic principle of the coupling for parallel misalinement is a kinematic motion termed "the fourth inversion of the double slider crank chain," but I apply the same in a novel arrangement, comprising interlocking planes whereby the inertia forces are absorbed in such a manner as to provide for quiet operation.

The action of the coupling when subjected to angular misalinement may be illustrated as follows. Referring to Fig. 1, let it be assumed that the plane of the paper is the plane of the axes of the coupler heads C and D, and the axis of the head C is at an angle to the axis of the head D, and that the bearing surfaces of the head C are normal to the bearing surfaces of the head D and are also normal to the plane of the paper. In this position, the housing E and its bearing surfaces are parallel to the axis of the head C while the head D has swivelled in the housing E to a degree sufficient to afford the required angularity. Next assume the shafts to have rotated 90°; whereupon the bearing surfaces of the head C will now be parallel with the plane of the paper while the bearing surfaces of the head D will be normal to the same. Also housing E will now be parallel with the axis of head D, while the head C will have swivelled relative to the housing. These two positions of the housing indicate that when rotating in the presence of an angular misalinement, the housing will oscillate between parallelism with the head C and with the head D.

Since both parallel and angular misalinement are separately possible, the combination of the two misalinements simply involves a complex motion of the housing in relation to the heads.

In Figs. 5 to 8, inclusive, I show a modified embodiment of my invention wherein the housing member E' is provided with a cylindrical, instead of a squared, bore; the bearing surfaces for the housing being provided by means of removable bearing blocks 14, of bronze or cast iron which fit into and interlock together at their ends within the bore of the housing, the inner faces of the blocks being provided with plane bearing surfaces to mate with the bearing surfaces of the shaft heads while the exterior surfaces of the block are arcuate to fit the bore of the housing E'.

To limit the axial movement of the shafts relative to each other and to hold the bearing blocks against movement longitudinal of the shaft, I have shown the housing E' provided at each end with a pair of opposed end walls or webs 15 between whose adjacent edges there is sufficient clearance for the insertion of a bearing block or the bearing surfaces of a shaft head, if the same be turned to the proper position. In assembling the coupling, the blocks are inserted one at a time and shifted into position, and the housing is first turned into proper position and the bearing surfaces of one of the heads is inserted into the end of the housing, and the housing is then turned 90° and the bearing surfaces of the other shaft head inserted into the other end of the housing and interlocked with those of the first inserted shaft head. The housing is then turned 45° relative to the shafts and bearing blocks, as shown in Fig. 6, in which position the end walls 15 limit the outward axial movement of the shafts and hold the blocks 14 snugly in place. The bearing blocks 14 are now locked against rotation in the housing E' by any convenient means. Thus I have shown a set screw 16 extending through a hole in the perimeter of the housing and screwed into a threaded hole in the adjacent block 14.

It is evident that the bearing blocks may be readily removed and replaced when necessary, and the coupling may be installed or taken down in a few moments. This coupling is especially applicable for use in connection with heavy or high speed shafting.

Other convenient embodiments of my invention will readily suggest themselves, but the foregoing are sufficient to illustrate its principles and its advantages.

Although, for the sake of clearness in the illustration of the principles of my invention, I have minutely described the practical embodiment of its principles shown in the drawings, I do not wish to limit myself thereby, but claim broadly—

1. A flexible coupling for shafting and the like characterized by the provision of two sets of exterior parallel flat bearing planes, one set being associated with each of the shaft ends and said sets interlocking together at right angles with clearance, in combination with a housing provided with interior flat bearing planes which mate by surface contact with the bearing planes of the shaft ends, the engagement of the shaft ends with the housing being entirely surface contact between the flat planes, whereby both angular and parallel misalinement are provided for.

2. A flexible coupling for shafting and the like characterized by the provision of two sets of exterior flat bearing planes, one set being associated with each of the shaft ends and said sets interlocking together at right angles with clearance, in combination with a housing provided with interior flat bearing planes which mate by surface contact with the bearing planes of the shaft ends, the engagement of the shaft ends with the housing being entirely surface contact between the flat planes, and clearance being provided in the housing, whereby each shaft end may swivel in the housing or move parallel to or in alinement with its axis, thus providing for angular and parallel misalinement and axial movement.

3. A flexible coupling for shafting and the like, comprising a housing provided with two sets of opposed interior flat bearing planes, a set of exterior flat bearing planes associated with each of the shaft ends, said second named sets being disposed at right angles to each other and interlocking with clearance and each of said second named sets by surface contact mating with one of said first named sets, the engagement between the shaft ends and the housing being entirely surface contact between the flat bearing surfaces.

4. A flexible coupling for shafting and the like comprising a housing provided with two sets of opposed interior flat bearing surfaces, said sets being disposed at right angles to each other, and said bearing surfaces being tangential to a circle described from the axis of the housing, a set of exterior parallel flat bearing planes associated with each of the shaft ends, said last mentioned bearing planes being by surface contact mated with the bearing planes of the housing and clearance being provided between the sets of bearing planes of the shaft ends when assembled in the housing, whereby parallel and angular misalinement and axial movement are provided for.

5. A flexible coupling for shafting and the like, comprising a housing having an annular bore, bearing blocks fitting into said bore and providing four exterior flat bearing planes disposed in the form of a square, and a pair of parallel exterior flat bearing planes associated with each shaft end, said last named sets of bearing planes, when assembled in the housing, interlocking together with clearance and mating by surface contact with the bearing planes of the said blocks, whereby angular and parallel misalinement and axial movement are provided for.

6. A flexible coupling for shafting and the like, comprising a housing having an annular bore, bearing blocks fitting into said bore and providing four interior flat bearing planes disposed in the form of a square, a pair of parallel exterior flat bearing planes associated with each shaft end, said last named sets of bearing planes, when assembled in the housing, interlocking together with clearance and mating by surface contact with the bearing planes of said blocks, whereby angular and parallel misalinement and axial movement are provided for, and means for anchoring said bearing blocks in the housing.

7. A flexible coupling for shafting and the like, comprising a housing having an annular bore, bearing blocks fitting into said bore and providing four interior flat bearing planes disposed in the form of a square, a pair of parallel exterior flat bearing planes associated with each shaft end, said last named sets of bearing planes, when assembled in the housing, interlocking together with clearance and mating by surface contact with the bearing planes of said blocks, whereby angular and parallel misalinement and axial movement are provided for, and means for limiting the axial movement of the bearing planes of the shaft ends.

Signed at Pittsburgh, Pa., this 3rd day of June, 1921.

CHARLES RAISIG.